(12) United States Patent
Pei et al.

(10) Patent No.: US 8,048,967 B2
(45) Date of Patent: Nov. 1, 2011

(54) METHOD FOR PREPARING NYLON MICROSPHERES AND NYLON MICROSPHERES PREPARED THEREBY

(75) Inventors: Aihua Pei, Shanghai (CN); Tingxiu Xie, Shanghai (CN); Guisheng Yang, Shanghai (CN)

(73) Assignee: Shanghai Genius Advanced Material (Group) Company, Ltd., Shanghai (CN)

( * ) Notice: Subject to any disclaimer, the term of this patent is extended or adjusted under 35 U.S.C. 154(b) by 0 days.

(21) Appl. No.: 12/269,428

(22) Filed: Nov. 12, 2008

(65) Prior Publication Data

US 2009/0123753 A1 May 14, 2009

Related U.S. Application Data

(63) Continuation of application No. PCT/CN2007/070038, filed on May 22, 2007.

(30) Foreign Application Priority Data

May 22, 2007 (WO) ............... PCT/CN2007/070038

(51) Int. Cl.
*C08F 297/02* (2006.01)
*C08G 69/18* (2006.01)
(52) U.S. Cl. ........ 525/426; 525/183; 525/312; 528/310; 528/312
(58) Field of Classification Search .................. 525/183, 525/312, 426; 528/310, 312
See application file for complete search history.

(56) References Cited

U.S. PATENT DOCUMENTS

| | | | | |
|---|---|---|---|---|
| 3,017,391 A * | 1/1962 | Butler et al. | ................. | 528/312 |
| 3,017,392 A * | 1/1962 | Butler et al. | ................. | 528/315 |
| 3,910,861 A * | 10/1975 | Wolvers et al. | ............... | 524/847 |
| 4,143,025 A * | 3/1979 | Feldmann et al. | ............ | 523/333 |
| 4,448,956 A * | 5/1984 | Lenke et al. | .................. | 528/312 |
| 4,599,393 A * | 7/1986 | Policastro | ........................ | 528/12 |
| 4,714,718 A | 12/1987 | Horn | | |
| 4,937,289 A * | 6/1990 | Koga et al. | .................... | 525/183 |
| 5,039,784 A * | 8/1991 | Canalini | ....................... | 528/312 |

(Continued)

FOREIGN PATENT DOCUMENTS

CN  1242791  1/2000

(Continued)

*Primary Examiner* — H. (Holly) T Le
(74) *Attorney, Agent, or Firm* — Hamre, Schumann, Mueller & Larson, P.C.

(57) ABSTRACT

A method for preparing nylon microspheres is provided, said method comprising steps (1), (2) and (3) or steps (1'), (2) and (3) as follows: (1) a radically polymerizable monomer is dispersed in a molten lactam monomer, and a free radical initiator is added, so that radical polymerization of the radically polymerizable monomer is carried out, to give a mixture of a free radical polymer and the lactam monomer; or (1') a mixture of a free radical polymer and a molten lactam monomer is provided; and (2) an initiator and an activator, used for anionic ring-opening polymerization of the lactam monomer, are added to the mixture obtained in step (1) wherein the remaining radically polymerizable monomer and water are removed, or to the mixture obtained in step (1'), so that the anionic ring-opening polymerization of the lactam is carried out to give a polymer alloy of the free radical polymer/polyamide; and (3) the free radical polymer in the polymer alloy obtained in step (2) is removed by dissolution, giving nylon microspheres. Nylon microspheres are also provided, wherein the weight average molecular weight of the nylon lies in the range of 10000-300000, and the particle size of the nylon microspheres lies in the range of 0.1-500 μm.

8 Claims, 1 Drawing Sheet

U.S. PATENT DOCUMENTS

| | | | |
|---|---|---|---|
| 5,242,733 A | 9/1993 | Windley | |
| 5,756,647 A * | 5/1998 | Schmid et al. | 528/323 |
| 7,740,938 B2 * | 6/2010 | Helft et al. | 428/402 |
| 7,772,329 B2 * | 8/2010 | Yang et al. | 525/432 |
| 2007/0269656 A1 | 11/2007 | Helft et al. | |
| 2010/0113661 A1 * | 5/2010 | Senff et al. | 524/261 |

FOREIGN PATENT DOCUMENTS

| | | |
|---|---|---|
| CN | 1250061 | 4/2000 |
| CN | 1346838 | 5/2002 |
| CN | 1351623 | 5/2002 |
| CN | 1434069 | 8/2003 |
| CN | 1624025 | 6/2005 |
| CN | 1690103 | 11/2005 |
| EP | 1636292 | 3/2006 |
| JP | 5345856 | 12/1993 |
| JP | 7324226 | 12/1995 |
| JP | 8073602 | 3/1996 |
| JP | 11080542 | 3/1999 |
| WO | 03097228 | 11/2003 |
| WO | WO 2005/000456 | 1/2005 |

* cited by examiner

METHOD FOR PREPARING NYLON MICROSPHERES AND NYLON MICROSPHERES PREPARED THEREBY

CROSS-REFERENCE TO RELATED APPLICATION(S)

This application is a continuation of International Patent Application No. PCT/CN2007/070038, filed on May 22, 2007, which claims priority to Chinese Patent Application No. 200610026805.9, filed on May 23, 2006, the entire contents of both of which are incorporated herein by reference.

TECHNICAL FIELD

The present invention relates to a method for preparing nylon microspheres and nylon microspheres prepared thereby. More particularly, the present invention relates to a method for preparing high molecular nylon microspheres with controllable particle size, and nylon microspheres with high molecular weight and controlled particle size.

TECHNICAL BACKGROUND

Nylon has been widely used in engineering plastics due to its high strength, high wearing resistance, high chemical resistance, and good deformation resistance and anti-aging ability. Nylon synthesized by anionic ring-opening polymerization has a much higher molecular weight than that of nylon synthesized by condensation polymerization, thus it is superior in applicability.

Nylon particles see a great potential for application in coatings and raw materials for rollforming molding and extrusion molding. Conventional processes for preparing nylon particles include solution precipitation, emulsion, direct polymerization, mechanical ground (low temperature, slicing process and air flow crush), and the like. These processes, however, typically suffer from such drawbacks as technical complexity, high cost and high energy consumption, irregular powder shape, large particle size and wide distribution of particle size, rendering significant difficulty in their practical application.

It is disclosed in European Patent No. EP1636292 that polyamide spherical particles were made by emulsion polymerization. It is disclosed in WO 03097228 that polyamide spherical particles were made by interfacial polycondensation. However, these two processes are not suitable for industrial application for their process complexity and the need of a great deal of solvent and dispersant.

A method is disclosed in Chinese Patent No. CN1624025 wherein a polyamide powder was obtained by mixing polyamide granules and a water soluble polymer to give a co-blend with polyamide as the dispersed phase and the water soluble polymer as the continuous phase, and then removing the water soluble polymer with water. While this method is desirable in industrialized manufacture, the preparation of polyamide powder used as the raw material requires consumption of a lot of energy.

SUMMARY OF THE INVENTION

One object of the invention is to provide a technically simple method for preparing nylon microspheres suitable for large-scale industrial production.

Another object of the invention is to provide nylon microspheres with high molecular weight and controlled particle size.

In the first aspect of the invention, a method for preparing nylon microspheres is provided, characterized by that the method includes steps (1), (2) and (3) or steps (1'), (2) and (3) as follows:

(1) A radically polymerizable monomer is dispersed in a molten lactam monomer, and a free radical initiator is added, so that radical polymerization of the radically polymerizable monomer is carried out to give a mixture of a free radical polymer and the lactam monomer; or (1') A mixture of a free radical polymer and a molten lactam monomer is provided; and (2) An initiator and an activator, used for anionic ring-opening polymerization of the lactam monomer, are added to the mixture obtained in step (1) wherein the remaining radically polymerizable monomer and water are removed, or to the mixture obtained in step (1'), so that the anionic ring-opening polymerization of the lactam is carried out to give a polymer alloy of the free radical polymer/polyamide; and (3) The free radical polymer in the polymer alloy obtained in step (2) is removed by dissolution, giving nylon microspheres.

In a preferred embodiment, the free radical polymer can be dissolved in the lactam monomer; and the radically polymerizable monomer is one or more of those selected from the monomers from which the free radical polymer can be formed and be soluble in the lactam monomer.

More preferably, the radically polymerizable monomer is one or more of those selected from the group consisting of acrylate, methylacrylate, acrylamide, acrylonitrile, styrene, methylstyrene, vinyl pyrrolidone, vinyl acetate, divinyl benzene, and derivatives thereof; and the radical polymer is a homopolymer of one monomer described above or a co-polymer of two or more monomers described above.

In a preferred embodiment, in step (1), the amount of the radically polymerizable monomer used is 5-80 weight % based on the total weight of the radically polymerizable monomer and the lactam monomer; and in step (1'), the amount of the free radical polymer used is 5-80 weight % based on the total weight of the free radical polymer and the lactam monomer.

More preferably, the amount of the radically polymerizable monomer used is 10-50 weight % based on the total weight of the radically polymerizable monomer and the lactam monomer; and in step (1'), the amount of the free radical polymer used is 10-50 weight % based on the total weight of the free radical polymer and the lactam monomer.

In a preferred embodiment, the lactam monomer is one or more of those selected from $C_4$-$C_{12}$ lactam, in which case when the lactam is of one type, the polyamide is a homopolymer thereof, and when the lactam is of two or more types, the polyamide is a co-polymer thereof.

In a preferred embodiment, the free radical polymerization in step (1) is carried out at 60-150° C.

In a preferred embodiment, the anionic ring-opening polymerization in step (2) is carried out at 120-250° C.

In a preferred embodiment, the anionic ring-opening polymerization of the lactam monomer is selected from static casting or reactive extrusion.

In a preferred embodiment, in step (1), the free radical initiator is one or more of those selected from the group consisting of azo initiators, organic peroxides initiators and oil soluble redox initiation systems, wherein the content of the free radical initiator is 0.05-5 weight % based on the total weight of the radically polymerizable monomer and the lactam monomer.

In a preferred embodiment, in step (2), the initiator is one or more of those selected from the group consisting of lactam metal compounds, alkali metals, alkali metal hydrides, alkali metal hydroxides, alkali alkoxides or alkaline carbonates, and the activator is one or more of those selected from the group consisting of substituted or unsubstituted isocynates, acetyl caprolactam, acyl chlorides or anhydrides.

More preferably, the initiator is one or more of those selected from the group consisting of sodium lactam, sodium, potassium, lithium, NaH, LiH, NaOH, KOH or $Na_2CO_3$.

In a preferred embodiment, the particle size of the nylon microspheres is controlled by tailoring the ratio of the free radical polymer to the lactam monomer.

In a preferred embodiment, the free radical polymer removed by way of dissolution in step (3) is recycled and combined with the molten lactam monomer, providing a mixture of the free radical polymer and the lactam monomer as defined in step (1'), so that microspheres can be prepared by sequentially carrying out steps (2) and (3).

In the second aspect of the invention, nylon microspheres are provided, characterized by that the weight average molecular weight of the nylon lies in the range of 10000-300000, and the particle size of the nylon microspheres lies in the range of 0.1-500 μm.

Preferably, the weight average molecular weight of the nylon lies in the range of 10000-80000, and the particle size of the nylon microspheres lies in the range of 0.5-100 μm.

More preferably, the weight average molecular weight of the nylon lies in the range of 25000-60000, and the particle size of the nylon microspheres lies in the range of 1-50 μm.

In a preferred embodiment, the nylon is a homopolymer of one monomer selected from $C_4$-$C_{12}$ lactams or a co-polymer of two of more monomers selected from $C_4$-$C_{12}$ lactams.

BRIEF DESCRIPTION OF THE INVENTION

Figure 1:
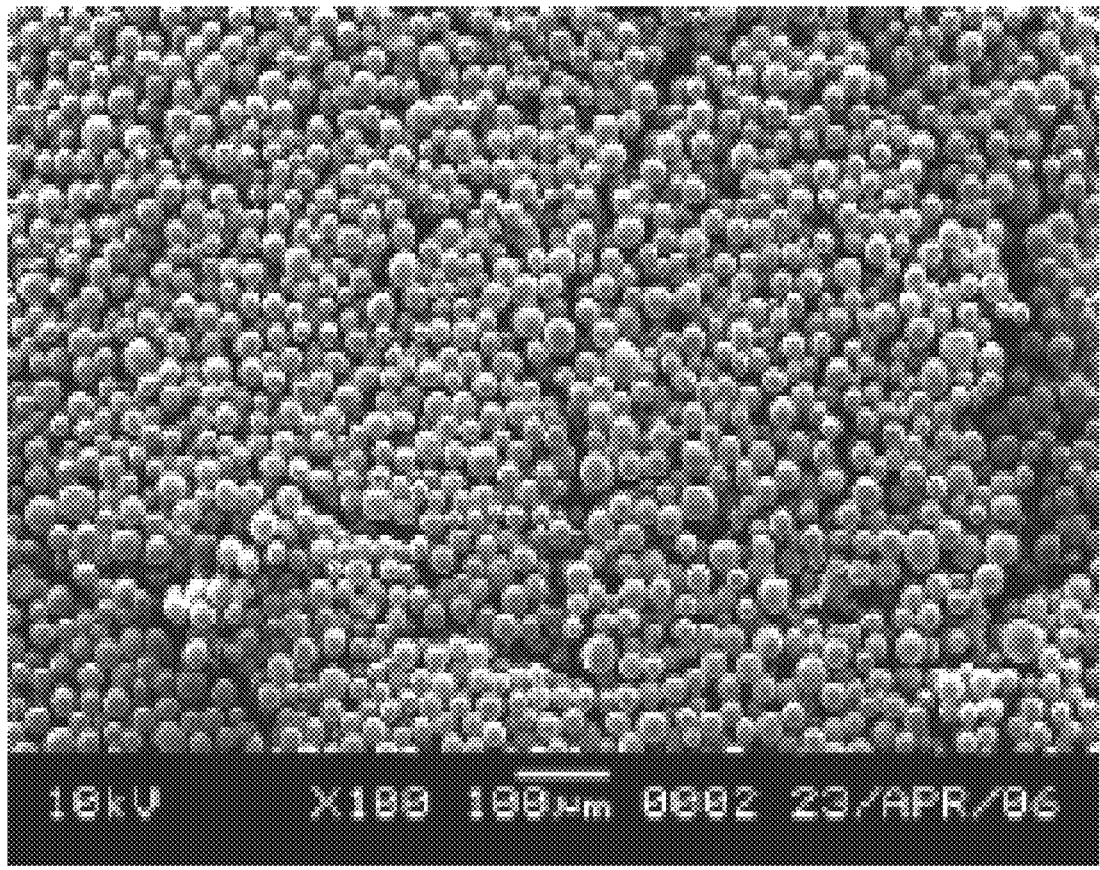
FIG. 1 shows the micrograph of the scanning electronic microscope (SEM) of the nylon 6 microspheres prepared according to Example 1 of the present invention, at a magnification of 100×.

In comparison with the prior art, a significant feature of the invention is the preparation of a polymer alloy of free radical polymer/polyamide by means of free radical polymerization and anionic ring-opening polymerization respectively in a continuous in-situ polymerization mode. A lactam is used as the solvent of the radically polymerizable monomer in the system, and the radically polymerizable monomer and the lactam monomer are polymerized separately in-situ by means of continuous solution radical polymerization and anionic ring-opening polymerization, to give an alloy of these monomers. In actuality, a number of free radical polymers per se are not soluble in lactam monomers, so that no polymer alloy of free radical polymer/polyamide can be obtained in-situ by way of anionic ring-opening polymerization. However, in accordance with the method disclosed in the present invention, a mixture of free radical polymer/lactam monomer obtained by free radical polymerization is a clear and stable system, and the presence of free radical polymer has no impact on the anionic ring-opening polymerization of the lactam monomer.

Another significant, also essential feature of the invention is the preparation of spherical nylon particles with regular shapes by means of phase-reversal. In general, in an alloy system of two polymers, the high-content polymer is present as a continuous phase, while the low-content polymer is present as a dispersed phase. The term "phase-reversal" means a situation in which the low-content polymer exists as a continuous phase, while the high-content polymer exists as a dispersed phase. After an extensive study, the inventors have found that in the polymer alloy system of free radical polymer/polyamide according to the invention, phase-reversal starts when the content of the free radical polymer is extremely low, so that a structure is formed where the free radical polymer exists as the continuous phase, while the polyamide (nylon) exists as the dispersed phase. During the phase-reversal, the polyamide is present as spherical particles, while the free radical polymer exists in the interspace between spheres in the polyamide phase, due to the viscosity, interface strain, and the like. The polyamide phase exists as regular spheres in this particular phase structure. Nylon microspheres with regular spherical shape can be prepared by dissolving a free radical polymer in a suitable organic solvent, followed by washing and drying.

Yet another feature of the invention is the capability of controlling the size of nylon spheres by tailoring the ratio of the contents of free radical polymer to lactam monomer. The size of the nylon spheres obtained is relatively large when the ratio of free radical polymer to lactam monomer is relatively low. As the ratio of free radical polymer to lactam monomer increases, the size of the nylon spheres decreases. In this way, nylon spheres with different particle sizes and particle size distributions can be obtained by modifying the proportions of the components of the polymer alloy, so that control over the size of nylon spheres can be achieved. More over, during the polymerization of the lactam, the molecular weight of the nylon obtained is higher at lower concentrations of the initiator and the activator based on the lactam; and the molecular weight of the nylon obtained decreases as the concentrations of the initiator and the activator increase. Thus, control over the molecular weight of the nylon microspheres can be achieved by modifying the concentrations of the initiator and the activator during the polymerization of the lactam.

In the method for preparing nylon microspheres according to the invention, a mixture of a free radical polymer and a lactam monomer can be obtained by either of the following two ways: (1) a radically polymerizable monomer is dispersed in a molten lactam monomer, and a free radical initiator is added, so that the free radical polymerization of the radically polymerizable monomer is carried out, providing a mixture of a free radical polymer and the lactam monomer; or (1') a mixture of a free radical polymer and a molten lactam monomer is provided. In other words, the mixture of a free radical polymer and a lactam monomer can be prepared either on spot (such as in step (1)), or by mixing a ready-made free radical polymer and a molten lactam monomer (such as in step (1')).

In a preferred embodiment, nylon microspheres are prepared in a continuous mode, wherein a mixture of a free radical polymer and a lactam monomer is prepared first by free radical polymerization as described in step (1), and then steps (2) and (3) are carried out to provide nylon microspheres. More over, the free radical polymer which is dissolved in a solvent and removed in step (3) may be recycled and used for mixing directly with the molten lactam monomer as described in step (1') in the subsequent production process, providing a mixture of the free radical polymer and the lactam monomer, and then steps (2) and (3) are carried out.

In the preparation method according to the invention, the free radical polymerization in step (1) is preferably carried out at a temperature in the range of 60-150° C. Depending on the type and amount of the free radical monomer, the time for the polymerization is typically 4-72 hours.

In the preparation method according to the invention, the solvent used in step (3) for dissolving and removing the free radical polymer is selected from those capable of dissolving free radical polymers but incapable of dissolving nylon, including, for example, but not limited to acetone, tetrahydrofuran (THF), water, toluene, xylene, butanone, ethyl acetate, propionitrile or mixtures thereof. Suitable solvents can be readily chosen by those in the art to dissolve and remove the free radical polymer, so as to provide nylon microspheres.

The method according to the invention has the main advantages as follows:

(1) The production process is simple, the operation is easy, and the energy consumption and the production cost are low;

(2) Some reagents used are recyclable, such as the solvent used to dissolve and remove the free radical polymer; and the free radical polymer dissolved is also recyclable;

(3) The technique according to the invention can not only provide nylon microspheres with regular spherical shape, but also realize effective control over the particle size of the nylon microspheres, e.g. in the range of 0.1-500 µm. Additionally, effective control over the molecular weight of the nylon microspheres can also be achieved, e.g. in the range of 10000-300000. Preferably, the weight average molecular weight of the nylon is in the range of 10000-80000, and the particle size of the nylon microspheres is in the range of 0.5-100 µm. More preferably, the weight average molecular weight of the nylon is in the range of 25000-60000, and the particle size of the nylon microspheres is in the range of 1-50 µm.

Nylon microspheres with regular spherical shape can be obtained according to the method for the invention. More desirably, the particle size and the molecular weight of the nylon microspheres can be controlled by modifying the content of the free radical polymer.

The nylon microspheres according to the invention can be used as powder coatings, and raw materials of rollforming molding and extrusion, and the like.

The invention will be further described in the following specific examples. It is to be understood that these examples are provided for illustrating the invention only, without any intention to limit the scope of the invention in any way. The experiments described in the examples without indicating specific conditions are to be carried out in conventional way, or under conditions specified by manufacturers. Unless otherwise indicated, all parts and percentages used in the disclosure are based on weight.

Example 1

Methyl methylacrylate (MMA) (25 weight %) and molten caprolactam were mixed and stirred at a constant temperature of 80° C., 0.2 weight % azobisisobutyronitrile (AIBN) was added, and the free radical polymerization was allowed to continue for 24 hours.

The mixture system was heated up to 160-180° C., and was evacuated for 20 minutes to remove the remaining MMA monomer and water. 4 weight % sodium caprolactam and 0.4 weight % 2,4-toluene diisocyanate (TDI) were added, mixed homogeneously, and statically cast at the mold temperature kept between 160-180° C.

The resultant polymer alloy of polymethyl methylacrylate (PMMA)/monomer cast nylon 6 (MCPA6) was crushed, and then PMMA was dissolved using acetone. After filtration and drying, nylon 6 microspheres were produced. The molecular weight of the nylon 6 microspheres was determined by gel permeation chromatography (GPC), the volume average particle size was determined by laser diffraction, and the results were given in table 1. The scanning electronic micrograph (SEM) of the nylon 6 microspheres according to this example was shown in FIG. 1. It can be seen from FIG. 1 that spherical nylon particles with regular shape can be obtained in accordance with the method for the invention.

Example 2

Methyl methylacrylate (MMA) (20 weight %) and molten caprolactam were mixed and stirred at a constant temperature of 100° C., 0.3 weight % isopropylbenzene hydroperoxide was added, and the free radical polymerization was allowed to continue for 20 hours.

The mixture system was kept at 120-140° C., and was evacuated for 20 minutes to remove the remaining MMA monomer and water. 4 weight % sodium caprolactam and 0.4 weight % TDI were added, mixed homogeneously, and statically cast at the mold temperature kept between 120-160° C.

The resultant polymer alloy of polymethyl methylacrylate (PMMA)/monomer cast nylon 8 (MCPA8) was crushed, and then PMMA was dissolved using acetone. After filtration and drying, nylon 8 microspheres were produced. The molecular weight of the nylon 8 microspheres was determined by gel permeation chromatography (GPC), the volume average particle size was determined by laser diffraction, and the results were given in table 1.

Example 3

Styrene (10 weight %) and molten caprolactam and octalactam (mass ratio 1:1) were mixed and stirred at a constant temperature of 120° C., 0.2 weight % isopropylbenzene hydroperoxide was added, and the free radical polymerization was allowed to continue for 20 hours.

The mixture system was heated up to 130-150° C., and was evacuated for 20 minutes to remove the remaining styrene monomer and water. 4 weight % sodium caprolactam and 0.4 weight % TDI were added, mixed homogeneously, and statically cast at the mold temperature kept between 140-180° C. The polymer alloy of polystyrene (PS)/monomer cast nylon 6/8 (MCPA6/8) was obtained.

PS in the resultant polymer alloy was dissolved using tetrahydrofuran (THF). After filtration and drying, nylon 6/8 microspheres were produced. The molecular weight of the nylon 6/8 microspheres was determined by gel permeation chromatography (GPC), the volume average particle size was determined by laser diffraction, and the results were given in table 1.

Example 4

Styrene (10 weight %) and molten caprolactam were mixed and stirred at a constant temperature of 60° C., and 0.2 weight % AIBN was added to initiate the free radical polymerization of styrene which was allowed to continue for 24 hours.

The system was heated up to 100-140° C., and was evacuated for 20 minutes to remove the remaining styrene monomer and water. 4 weight % NaH and 0.4 weight % TDI were added, mixed homogeneously, and statically cast at the mold temperature kept between 160-180° C.

PS in the resultant polymer alloy of polystyrene (PS)/monomer cast nylon 6 (MCPA6) was dissolved using tetrahydrofuran (THF). After filtration and drying, the desirable nylon 6 microspheres were produced. The molecular weight of the nylon 6 microspheres was determined by gel permeation chromatography (GPC), the volume average particle size was determined by laser diffraction, and the results were given in table 1.

Example 5

Vinyl pyrrolidone (10 weight %) and molten butyrolactam were mixed and stirred at a constant temperature of 80° C., and 0.3 weight % AIBN was added to initiate the free radical polymerization which was allowed to continue for 24 hours.

The system was heated up to about 180° C., and was evacuated for 30 minutes to remove the remaining vinyl pyrrolidone monomer and water. 2 weight % KOH and 0.2 weight % TDI were added, mixed homogeneously, and statically cast at the mold temperature kept between 140-160° C.

The resultant polymer alloy of polyvinyl pyrrolidone (PVP)/monomer cast nylon 4 (MCPA4) was crushed, and PVP was dissolved using water. After filtration and drying, the desirable nylon 4 microspheres were produced. The molecular weight of the nylon 4 microspheres was determined by gel permeation chromatography (GPC), the volume average particle size was determined by laser diffraction, and the results were given in table 1.

Example 6

Methyl styrene (50 weight %) and molten caprinolactam were mixed and stirred at a constant temperature of 100° C., and 0.3 weight % AIBN was added to initiate the free radical polymerization of methyl styrene which was allowed to continue for 24 hours.

The system was kept at 160-170° C., and was evacuated for 30 minutes to remove the remaining methyl styrene monomer and water. 2 weight % sodium caprolactam and 0.2 weight % TDI were added, mixed homogeneously, and statically cast with the mold temperature kept between 160-180° C.

The resultant polymer alloy of polymethyl styrene (PMS)/monomer cast nylon 10 (MCPA10) was crushed, and PMS was dissolved using toluene. After filtration and drying, the desirable nylon 10 microspheres were produced. The molecular weight of the nylon 10 microspheres was determined by gel permeation chromatography (GPC), the volume average particle size was determined by laser diffraction, and the results were given in table 1.

Example 7

Acrylonitrile (35 weight %) and molten laurolactam were mixed and stirred at a constant temperature of 150° C., 0.5 weight % diisopropylbenzene peroxide was added as an initiator, and the free radical polymerization was allowed to continue for 12 hours.

The system was kept at 150-170° C., and was evacuated for 20 minutes to remove the remaining acrylonitrile monomer and water. 2 weight % sodium caprolactam and 0.2 weight % TDI were added, mixed homogeneously, and statically cast at the mold temperature kept between 160-190° C.

The resultant polymer alloy of polyacrylonitrile (PAN)/monomer cast nylon 12 (MCPA12) was crushed, and PAN was dissolved using propionitrile. After filtration and drying, the desirable nylon 12 microspheres were produced. The molecular weight of the nylon 12 microspheres was determined by gel permeation chromatography (GPC), the volume average particle size was determined by laser diffraction, and the results were given in table 1.

Example 8

Polystyrene (PS) (available from Beijing Yanshan Petrochemical Co. under designation of 666D, molecular weight 260000) (15 weight %) and molten caprolactam were mixed and stirred at a constant temperature of 120° C.

After the mixture system was heated up to 160-180° C., 4 weight % sodium caprolactam and 0.4 weight % 2,4-toluene diisocyanate (TDI) were added, mixed homogeneously, and statically cast at the mold temperature kept between 160-180° C.

The resultant polymer alloy of polystyrene (PS)/monomer cast nylon 6 (MCPA6) was crushed, and PS was dissolved using toluene. After filtration and drying, the desirable nylon 6 microspheres were produced. The molecular weight of the nylon 6 microspheres was determined by gel permeation chromatography (GPC), the volume average particle size was determined by laser diffraction, and the results were given in table 1.

Example 9

Methyl methylacrylate (15 weight %) and molten caprolactam were mixed and stirred at a constant temperature of 90° C., and 0.4 weight % dibenzoyl peroxide (BPO) was added to initiate the free radical polymerization which was allowed to continue for 24 hours.

The system was heated up to 150-180° C., and was evacuated for 20 minutes to remove the remaining monomer and water. The above system was introduced into a reactive extruder, and after 4 weight % sodium caprolactam and 0.4 weight % TDI were added, reactive extrusion was carried out, the reaction temperature was kept at 250° C.

PMMA in the resultant polymer alloy of polymethyl methylacrylate (PMMA)/nylon 6 (PA6) was dissolved using acetone. After drying, the desirable nylon 6 microspheres were produced. The molecular weight of the nylon 6 microspheres was determined by gel permeation chromatography (GPC), the volume average particle size was determined by laser diffraction, and the results were given in table 1.

Example 10

Styrene (40 weight %) and molten caprolactam were mixed and stirred at a constant temperature of 80° C., and 0.3 weight % AIBN was added to initiate the free radical polymerization of styrene which was allowed to continue for 24 hours.

The system was heated up to 100-120° C., and was evacuated for 20 minutes to remove the remaining styrene monomer and water. The above system was introduced into a reactive extruder, and after 2 weight % sodium caprolactam and 0.2 weight % TDI were added, reactive extrusion was carried out, the reaction temperature was kept at 250° C.

PS in the resultant polymer alloy of polystyrene (PS)/nylon 6 (PA6) was dissolved using THF. After drying, the desirable nylon 6 microspheres were produced. The molecular weight of the nylon 6 microspheres was determined by gel permeation chromatography (GPC), the volume average particle size was determined by laser diffraction, and the results were given in table 1.

Example 11

Vinyl pyrrolidone (25 weight %) and molten caprolactam were mixed and stirred at a constant temperature of 90° C., and 0.3 weight % BPO was added to initiate the free radical polymerization which was allowed to continue for 24 hours.

The system was heated up to 120-140° C., and was evacuated for 20 minutes to remove the remaining vinyl pyrrolidone monomer and water. The above system was introduced into a reactive extruder, and after 2 weight % sodium caprolactam and 0.2 weight % acetyl chloride were added, reactive extrusion was carried out, the reaction temperature was kept at 230° C.

PVP in the resultant polymer alloy of polyvinyl pyrrolidone (PVP)/nylon 6 (PA6) was dissolved using water. After filtration and drying, the desirable nylon 6 microspheres were produced. The molecular weight of the nylon 6 microspheres was determined by gel permeation chromatography (GPC), the volume average particle size was determined by laser diffraction, and the results were given in table 1.

Example 12

Vinyl pyrrolidone (40 weight %) and molten capryllactam were mixed and stirred at a constant temperature of 120° C., 0.3 weight % isopropylbenzene hydroperoxide was added, and the free radical polymerization was allowed to continue for 24 hours.

The system was heated up to 120-180° C., and was evacuated for 20 minutes to remove the remaining vinyl pyrrolidone monomer and water. The above system was introduced into a reactive extruder, and after 2 weight % sodium carbonate and 0.2 weight % TDI were added, reactive extrusion was carried out, the reaction temperature was kept at 250° C.

PVP in the resultant polymer alloy of polyvinyl pyrrolidone (PVP)/nylon 8 (PA8) was dissolved using water. After filtration and drying, the desirable nylon 8 microspheres were produced. The molecular weight of the nylon 8 microspheres was determined by gel permeation chromatography (GPC), the volume average particle size was determined by laser diffraction, and the results were given in table 1.

Example 13

Acrylamide (80 weight %) and molten laurolactam were mixed and stirred at a constant temperature of 150° C., 0.2 weight % hydroperoxide was added, and the free radical polymerization was allowed to continue for 6 hours.

The system was heated up to 150-180° C., and was evacuated for 20 minutes to remove the remaining monomer and water. The above system was introduced into a reactive extruder, and after 2 weight % sodium caprolactam and 0.2 weight % TDI were added, reactive extrusion was carried out, the reaction temperature was kept at 250° C.

PVP in the resultant polymer alloy of polyacrylamide (PAM)/nylon 12 (PA12) was dissolved using water. After filtration and drying, the desirable nylon 12 microspheres were produced. The molecular weight of the nylon 12 microspheres was determined by gel permeation chromatography (GPC), the volume average particle size was determined by laser diffraction, and the results were given in table 1.

Example 14

Polymethyl methylacrylate (PMMA) (available from Shanghai Bihua Co. under designation of 255, molecular weight 122000) (20 weight %) and molten caprolactam were mixed and stirred at a constant temperature of 80° C.

The mixture system was heated up to 160-180° C., 4 weight % sodium caprolactam and 0.4 weight % TDI were added, and reactive extrusion was carried out while the temperature was kept at 250° C.

The resultant polymer alloy of polymethyl methylacrylate (PMMA)/nylon 6 (PA6) was crushed, and PAAM was dissolved using acetone. After filtration and drying, the desirable nylon 6 microspheres were produced. The molecular weight of the nylon 6 microspheres was determined by gel permeation chromatography (GPC), the volume average particle size was determined by laser diffraction, and the results were given in table 1.

Example 15

A mixture of styrene and methyl styrene (40 weight %, including 30 weight % styrene and 10 weight % methyl styrene) and molten caprolactam were mixed and stirred at a constant temperature of 100° C., and 0.05 weight % AIBN was added to initiate the free radical polymerization, giving a solution of styrene-methyl styrene co-polymer/caprolactam.

After 5 weight % NaCl and 2 weight % acetyl caprolactam were added to this solution, reactive extrusion was carried out in a reactive type twin screw extruder, the reaction temperature was kept at 240° C.

The resultant polymer alloy was crushed, and styrene-methyl styrene co-polymer was dissolved using water. After filtration and drying, the desirable nylon 6 microspheres were produced. The molecular weight of the nylon 6 microspheres was determined by gel permeation chromatography (GPC), the volume average particle size was determined by laser diffraction, and the results were given in table 1.

Example 16

Styrene (5 weight %) and molten caprolactam were mixed and stirred at a constant temperature of 100° C., 0.04 weight % AIBN was added to initiate the free radical polymerization, and then a solution of polystyrene/caprolactam was obtained. To this solution was added 0.2 weight % NaOH and 2 weight % HDI (hexamethylene diisocyanate), and polymerization was carried out in a mold, the reaction temperature was kept at 240° C.

The resultant polymer alloy was crushed, and polystyrene was dissolved using water. After filtration and drying, the desirable nylon 6 microspheres were produced. The molecular weight of the nylon 6 microspheres was determined using gel permeation chromatography (GPC), the volume average particle size was determined using laser diffraction, and the results were given in table 1.

TABLE 1

| Ex. No. | Particle size (μm) | Weight Average Molecular Weight (g/mol) |
| --- | --- | --- |
| 1 | 22 | $3.3 \times 10^4$ |
| 2 | 48 | $4.9 \times 10^4$ |
| 3 | 120 | $5.7 \times 10^4$ |
| 4 | 110 | $4.0 \times 10^4$ |
| 5 | 105 | $2.0 \times 10^4$ |
| 6 | 3.7 | $2.3 \times 10^4$ |
| 7 | 16 | $2.9 \times 10^4$ |
| 8 | 100 | $4.2 \times 10^4$ |
| 9 | 95 | $3.9 \times 10^4$ |
| 10 | 5.4 | $4.3 \times 10^4$ |
| 11 | 20 | $5.2 \times 10^4$ |
| 12 | 4.3 | $2.9 \times 10^4$ |
| 13 | 1.4 | $1.2 \times 10^4$ |
| 14 | 39 | $3.8 \times 10^4$ |
| 15 | 4.5 | $2.9 \times 10^4$ |
| 16 | 318 | $6.3 \times 10^4$ |

What is claimed:

1. A method for preparing nylon microspheres, wherein the method includes steps (1), (2) and (3) or steps (1'), (2) and (3) as follows:

(1) dispersing a radically polymerizable monomer in a molten lactam monomer, and adding a free radical initiator, so that radical polymerization of the radically polymerizable monomer is carried out, to give a mixture of a free radical polymer and the lactam monomer; or (1') providing a mixture of a free radical polymer and a molten lactam monomer; and (2) adding an initiator and an activator, used for anionic ring-opening polymerization of the lactam monomer, to the mixture obtained in step (1) wherein the remaining radically polymerizable monomer and water are removed, or to the mixture obtained in step (1'), so that the anionic ring-opening polymerization of the lactam is carried out to give a polymer alloy of the free radical polymer/polyamide; and (3) removing the free radical polymer in the polymer alloy obtained in step (2) by dissolution, giving nylon microspheres.

2. A method as described in claim 1, wherein the free radical polymer can be dissolved in the lactam monomer; and the radically polymerizable monomer is one or more of those selected from the monomers from which the free radical polymer can be formed and be soluble in the lactam monomer.

3. A method as described in claim 1, wherein in step (1), the amount of the radically polymerizable monomer used is 5-80 weight % based on the total weight of the radically polymerizable monomer and the lactam monomer; and in step (1'), the amount of the free radical polymer used is 5-80 weight % based on the total weight of the free radical polymer and the lactam monomer.

4. A method as described in claim 1, wherein the lactam monomer is one or more of those selected from $C_4$-$C_{12}$ lactam, in which case when the lactam is of one type, the polyamide is a homopolymer thereof, and when the lactam is of two or more types, the polyamide is a co-polymer thereof.

5. A method as described in claim 1, wherein the free radical polymerization in step (1) is carried out at 60-150° C.; and/or the anionic ring-opening polymerization in step (2) is carried out at 120-250° C.; and/or the anionic ring-opening polymerization process of the lactam monomer is selected from static casting process or reactive extrusion process.

6. A method as described in claim 1, wherein in step (1), the free radical initiator is one or more of those selected from the group consisting of azo initiators, organic peroxides initiators and oil soluble redox initiation systems, wherein the content of the free radical initiator is 0.05-5 weight % based on the total weight of the radically polymerizable monomer and the lactam monomer; and/or in step (2), the initiator is one or more of those selected from the group consisting of lactam metal compounds, alkali metals, alkali metal hydrides, alkali metal hydroxides, alkali alkoxides and alkaline carbonates; and the activator is one or more of those selected from the group consisting of substituted or unsubstituted isocyanates, acetyl caprolactam, acyl chlorides and anhydrides.

7. A method as described in claim 1, wherein the particle size of the nylon microspheres is controlled by tailoring the ratio of the free radical polymer to the lactam monomer.

8. A method as described in claim 1, wherein the free radical polymer removed by way of dissolution in step (3) is recycled and combined with the molten lactam monomer, providing a mixture of the free radical polymer and the lactam monomer as defined in step (1'), so that microspheres can be prepared by sequentially carrying out steps (2) and (3).

* * * * *